Dec. 28, 1926.

C. CROW ET AL

LIGHT

Filed Jan. 13, 1926

1,612,703

Ray Crow
Carl Crow,
INVENTORS

BY Victor J. Evans
ATTORNEY

WITNESS:
P. T. Hickey.

Patented Dec. 28, 1926.

1,612,703

UNITED STATES PATENT OFFICE.

CARL CROW AND RAY CROW, OF ROSSVILLE, GEORGIA.

LIGHT.

Application filed January 13, 1926. Serial No. 81,092.

This invention relates to improvements in ornamental lights for use upon motor vehicles consisting of a rotatable housing carrying a plurality of reflectors and having mirrors extending outwardly therefrom and reflecting the rays of light from the mirrors incident to the rotation of the ball by the velocity of the wing and illuminated by means supported within the housing.

Another object of my invention resides in the provisions of a shade arranged directly behind an incandescent lamp bulb mounted within the housing whereby the motor vehicle operator may not have his line of vision disturbed by the reflections of the light incident to the rotation of the device.

With the above and other objects in view, the invention further includes the following novel features and details of construction, to be hereinafter more fully described, illustrated in the accompanying drawings and pointed out in the appended claims.

In the drawings:—

Figure 1:
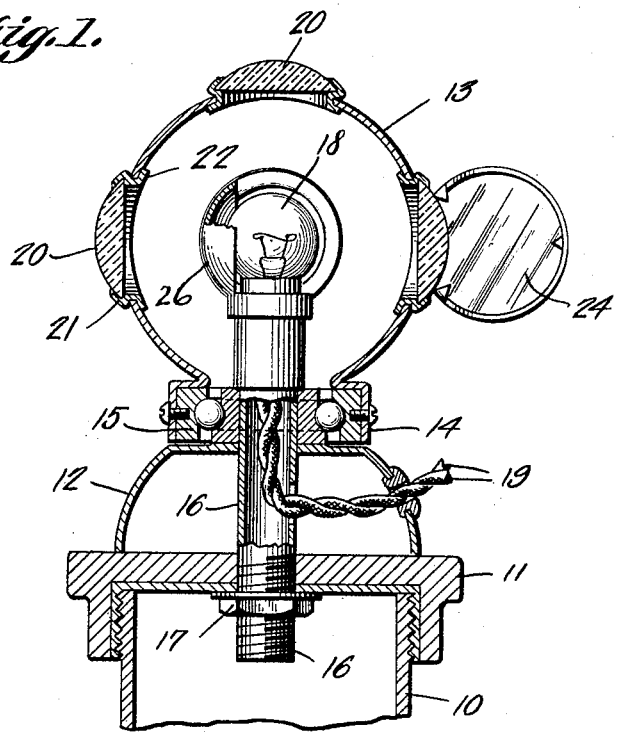
Figure 1 is a vertical sectional view taken through my invention as applied upon a motor vehicle radiator cap.
Figure 2:
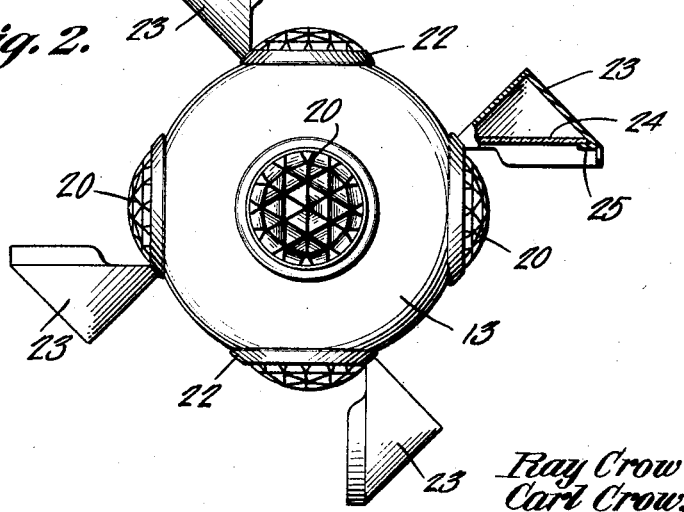
Figure 2 is a top plan view of my invention per se.

Referring to the drawing in detail, wherein like characters of reference denote corresponding parts, the reference character 10 indicates the neck of an automobile radiator, not shown, having a cap 11 secured thereto and supporting a base 12 upon its upper side as clearly illustrated in Figure 1 of the drawing. A ball like housing 13 forming a sleeve portion 14 upon its under side to receive a ball bearing 15 therein. A hollow tubular member 16 extends from the ball like housing 13 through the ball bearing 15, base 12 and radiator cap 11 and is threaded as indicated at 16 upon its lower end for the reception of a fastening element 17 thereon for supporting the ball like housing 13 thereupon. The upper free end of the tubular member 16 within the ball like housing 13 supports an incandescent lamp bulb 18 and has conducting wires 19 leading therefrom and extending through the base 12 and in turn associated and connected with the source of electrical energy carried by the vehicle to which the invention is applied.

Arranged upon diametrically opposite sides and upon the top of the ball like housing 13 is a plurality of colored lenses 20 having their peripheries or marginal edges fitted within grooves 21 formed in supporting rings 22. Extending outwardly from diametrically opposite sides of the ball like housing 13 and upon and adjacent the sides of the lens 20, so that the same may readily and easily reflect the rays of light therefrom, incident to the rotation of the ball like housing 13, in a clock-wise movement, are conical shaped members 23 having mirrors 24 positioned therein and held in place by inwardly struck ears 25 upon the periphery of the conical shaped members 23.

A shade 26 is positioned upon the upper free end of the tubular member 16 directly behind the incandescent lamp bulb 18 in order that none of the rays of light from the incandescent lamp bulb may be seen through any of the lenses 20 upon the rear portion of the ball like housing 13 and hence offering no incumbrance to the vision of the motor vehicle driver.

The invention is susceptible of various changes in its form, proportions and minor details of construction, and the right is herein reserved to make such changes as properly fall within the scope of the appended claims.

Having thus described the invention, what is claimed is:—

1. A fixture for use upon automobiles comprising a base having a ball like housing rotatably mounted upon its upper side having a plurality of colored lenses arranged upon its top and diametrically opposite sides thereof, a plurality of correspondingly positioned outwardly extending conical shaped members supporting mirrors therein being arranged adjacent the lenses, and means for illuminating the housing whereby the rays of light from the colored lenses may be reflected by the mirrors positioned within the conical shaped members.

2. A lighting fixture for use upon motor vehicles comprising a base, a ball like housing having a circular portion provided upon its under side and supporting a bearing therein, a tubular member extending downwardly through the bearing and base from a lamp socket provided within the housing for securing the fixture to an appropriate portion of a motor vehicle, said housing having openings provided within its top and upon diametrically opposite sides thereof and grooved rings therein for engaging the periphery of and supporting the colored lenses upon the housing, and a plurality of conical shaped members arranged adjacent the lenses and supporting mirrors therein upon the sides of the lenses capable of being seen from a clock-wise movement of the housing.

In testimony whereof we affix our signatures.

CARL CROW.
RAY CROW.